H. L. REED.
NUT LOCK.
APPLICATION FILED DEC. 7, 1908.

968,078.

Patented Aug. 23, 1910.

Attest.
H. G. Fletcher
W. P. Smith

Inventor.
Homer L. Reed.
By Hughson & Laugan
attys.

UNITED STATES PATENT OFFICE.

HOMER L. REED, OF LOUISIANA, MISSOURI.

NUT-LOCK.

968,078.  Specification of Letters Patent.  Patented Aug. 23, 1910.

Application filed December 7, 1908. Serial No. 466,287.

*To all whom it may concern:*

Be it known that I, HOMER L. REED, a citizen of the United States, and resident of Louisiana, Pike county, Missouri, have invented certain new and useful Improvements in Nut-Locks, of which the following is a specification containing a full, clear, and exact description, reference being had to the accompanying drawings, forming a part hereof.

My invention relates to a nut lock, the object of my invention being to provide a nut with a pivoted dog or detent provided with points which will engage in the thread of the bolt on which the nut is positioned, thus effectually locking the nut to the bolt and preventing its becoming loosened as a result of vibration of the parts on which the bolt and nut are located.

A further object of my invention is to provide a nut with a pivoted detent or dog, the points of which will engage in the thread of the bolt when the nut is moved in one direction, and which detent or dog will be disengaged from the thread when the nut is shifted in the opposite direction.

Figure 1:
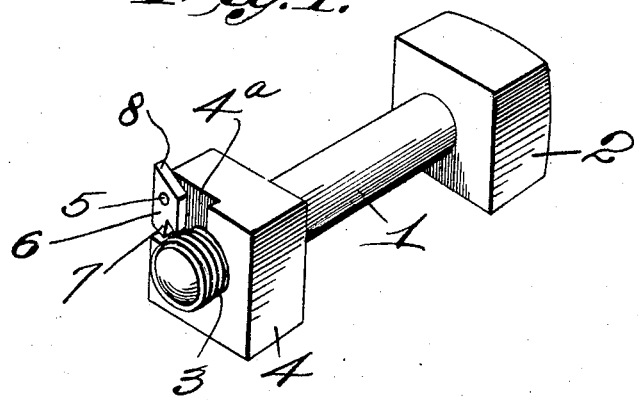
Figure 2:
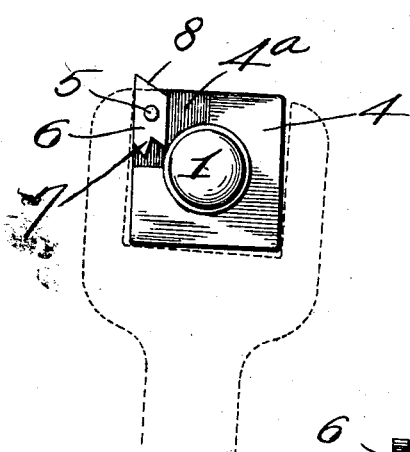
Figure 3:
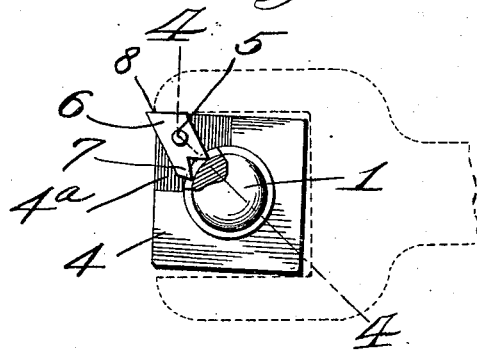
Figure 4:
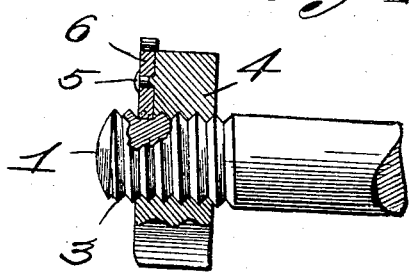

To the above purposes, my invention consists in certain novel features of construction and arrangement of parts which will be hereinafter more fully described, pointed out in the claims, and illustrated in the accompanying drawings, in which:

Figure 1 is a perspective view of an ordinary bolt, a nut located thereon, and said nut being equipped with the improved locking means as contemplated by my invention; Fig. 2 is an elevation of the nut in position on the end of a bolt, and showing the engaging end of the locking device disengaged from the bolt; Fig. 3 is an elevation similar to Fig. 2, and showing the forward end of the locking device engaged in the thread of the bolt; and Fig. 4 is a section taken on the line 4—4 of Fig. 3.

Referring by numerals to the accompanying drawings: 1 designates the body or shank of a bolt provided on one end with the usual head 2, the opposite end being provided with a thread 3.

4 designates the nut, which is provided with the usual screw-threaded opening whereby said nut is screw-seated on the end of the bolt, and formed in the outer face of this nut, preferably at one corner thereof, is a recess 4ª.

Formed integral with or fixed to the nut within this recess is a stud or projection 5, on which is pivotally arranged a short plate 6, which performs the function of a detent or dog, the forward end of which plate is provided with pointed teeth 7 of unequal lengths, which are adapted to engage in the thread 3 formed on the bolt to lock the nut thereon against movement in either direction, and the teeth 7 on this plate are in width equal to the pitch of the thread 3. This double locking function, or in other words the locking of the nut against movement on the bolt in either direction, is due to the fact that the end of one tooth is farther from the pivot of the plate 6 than the end of the other tooth and to the fact that when the bolt is in a locking position the two teeth engage the bolt on opposite sides of a line connecting the center of the bolt with the pivot of the plate 6. The end of the detent opposite the end provided with the teeth is provided with a beveled face 8, which occupies the same plane as does one of the side faces of the nut when the teeth of the detent engage the thread 3.

After a nut of my improved invention has been located upon the threaded end of the bolt and said nut has been tightened against the body through which the bolt passes, the nut is given a slight reverse movement with the same wrench with which it has been tightened, and by so doing the teeth 7 of the detent bear against and engage in the thread 3 of the bolt, thereby rigidly locking the nut against rotation in every direction, and when it is desired to remove the nut from the bolt, a wrench or the like is applied to the nut, and the same is rotated so as to tighten the nut, which action causes the teeth of the detent to automatically disengage from the thread on the bolt and the nut is now free to be unscrewed from said bolt.

In Fig. 2 I have shown a wrench in dotted lines applied to the nut and holding the detent while the nut is being screw-seated upon or removed from the bolt, and during these operations the detent is held with its teeth out of engagement with the thread on the bolt.

In Fig. 3 I have shown a wrench in dotted lines applied to the nut and showing one of the jaws of the wrench bearing against the inclined face 8 on the outer end of the detent, which is the position the parts assume when the teeth of the detent are caused to engage the thread of the bolt.

A nut lock of my improved construction is very simple, inexpensive, can be readily applied to all forms and sizes of nuts, is particularly adapted for locking nuts upon bolts which are applied to constructions which receive excessive vibration, and the nuts constructed in accordance with my invention may be readily placed in position upon or removed from the bolts by means of an ordinary wrench.

I claim:

1. As a new article of manufacture, a nut, a detent pivotally mounted on the outer face of the nut, teeth formed on the inner end of the detent, which teeth are arranged for engagement with the thread of the bolt to prevent movement of the nut relative to the bolt in either direction, the end of one of said teeth being farther from the pivotal point of the detent than the end of the other tooth and said teeth being located on opposite sides of a line connecting the center of the bolt with the pivot of the detent.

2. As a new article of manufacture, a nut, a detent pivotally mounted on the outer face of the nut, teeth formed on the inner end of the detent, which teeth are arranged for engagement with the thread of the bolt to prevent movement of the nut relative to the bolt in either direction, the end of one of said teeth being farther from the pivotal point of the detent than the end of the other tooth and said teeth being located on opposite sides of a line connecting the center of the bolt with the pivot of the detent, the outer margins of the detent being arranged to be engaged by a wrench in such manner as to move the teeth of the detent either into or out of engagement with the threads of the bolt.

In testimony whereof, I have signed my name to this specification, in presence of two subscribing witnesses.

HOMER L. REED.

Witnesses:
J. D. MERIWETHER,
EUGENE DUNCAN.